3,700,612
AQUEOUS SURFACE-COATING COMPOSITIONS CONTAINING HYDROXYALKYL ETHERS OF GALACTOMANNAN GUMS AS THICKENERS
Joseph Fath, Lebanon, and Marvin Rosen, Warren, N.J., assignors to Tenneco Chemicals, Inc.
No Drawing. Filed June 23, 1971, Ser. No. 156,050
Int. Cl. C08d 9/06; C08g 5/20
U.S. Cl. 260—17.4 ST        8 Claims

ABSTRACT OF THE DISCLOSURE

Aqueous surface-coating compositions that contain as thickener a hydroxyalkyl ether of a galactomannan gum having a degree of substitution of 0.10 to 3.0 are characterized by excellent flow and leveling characteristics, viscosity stability, and other valuable properties.

---

This invention relates to aqueous dispersions of water-insoluble materials that are adapted for use as surface-coating compositions. More particularly, it relates to the thickening of such aqueous dispersions and to the thickened dispersions thereby obtained.

Aqueous dispersions of water-insoluble synthetic polymers have found widespread use as surface-coating compositions because they form films that have an excellent combination of physical properties, because they are free from the hazards of flammability and solvent toxicity, and because they can be applied over damp surfaces. Thickening agents are generally used in these aqueous dispersions to stabilize them by inhibiting the coalescence or flocculation of the dispersed particles of the resinous binder as well as to bring them to suitable viscosity for application by spray, by brush, or by roller. While a number of thickeners have been suggested for use in these aqueous dispersions, none has proven entirely satisfactory in this application. Some, such as methylcellulose, hydroxyethylcellulose, and treated bentonites, form thickened compositions that often do not have the required flow and leveling properties, while others, such as casein and alginates, have a deleterious effect on the water-resistance and other physical properties of the coating compositions to which they are added.

It has now been discovered that the use of a new class of thickeners in aqueous dispersions of water-insoluble linear polymers results in surface-coating compositions that have a better combination of physical properties than do those that contain the previously-known thickeners. The thickeners that are used in the surface-coating compositions of this invention are hydroxyalkyl ethers of galactomannan gums that have degrees of substitution in the range of 0.1 to 3.0. When these thickeners are added to aqueous dispersions of film-forming polymers, coating compositions are obtained that spread smoothly without sagging or balling and that have excellent flow and leveling characteristics and other valuable properties.

The hydroxyalkyl ethers of galactomannan gums that are used in the practice of this invention are prepared by the reaction of a galactomannan gum with an alkylene oxide that has from 2 to 6 carbon atoms. Galactomannan gums, which are found in the endo-sperm of leguminous seeds, such as guar, locust bean, honey locust, flame tree, and the like, are polysaccharides that are composed principally of galactose units and mannose units, which have an average of three reactive hydroxyl groups per unit.

In these gums, the degree of substitution (D.S.) is the average number of hydroxyl groups substituted per anhydrohexose unit.

The reaction between the galactomannan gum and an alkylene oxide, such as ethylene oxide, propylene oxide, butylene oxide, or hexylene oxide, is generally carried out at a temperature between 20° C. and 100° C. under a pressure of 15 p.s.i.g. to 130 p.s.i.g. and in the presence of an alkaline catalyst, such as sodium hydroxide or calcium hydroxide. The reaction is carried out in the presence of water and in most cases an organic solvent, such as ethanol, isopropanol, tert.butanol, pentane, heptane, and the like.

The proportions of the reactants can be varied over a relatively wide range to provide products having varying degrees of substitution. Satisfactory products have been obtained using about 0.1 equivalent to 3 equivalents of alkylene oxide per anhydrohexose unit of the gum. These products have degrees of substitution in the range of 0.1 to 3.0. The preferred ethers for use as thickeners in the aqueous surface-coating compositions of this invention are hydroxyethyl ethers of guar that have degrees of substitution in the range of 0.50 to 2.0.

The dispersions that can be thickened by the addition of the hydroxyalkyl ether of a galactomannan gum to form compositions that are useful as surface coatings are aqueous dispersions that contain resinous binders that are water-insoluble synthetic addition polymers, condensation polymers, or mixtures thereof. The dispersions of addition polymers are ordinarily prepared by the emulsion polymerization of polymerizable materials, especially those of monoethylenically-unsaturated character. Examples of the polymeric materials that can be used as the resinous binder in the aqueous dispersions are polyvinyl acetate; copolymers of vinyl acetate with ethylene; copolymers of vinyl acetate with maleic acid or fumaric acid esters of alcohols having 1 to 8 carbon atoms; copolymers of vinyl chloride with vinylidene chloride; polyethylene; polyisobutylene; polystyrene; copolymers of styrene with butadiene; copolymers of acrylonitrile with butadiene; copolymers of methacrylic acid esters of alcohols having 1 to 8 carbon atoms with vinyl acetate, vinyl chloride, acrylonitrile, or styrene; copolymers of acrylic acid esters of alcohols having 1 to 8 carbon atoms with vinyl acetate, vinyl chloride, acrylonitrile, or styrene; copolymers of the aforementioned acrylic acid esters, the aforementioned methacrylic acid esters, and acrylic acid or methacrylic acid; and oleoresinous binders including blends of drying oils or bodied drying oils with a resin component such as limed rosin, ester gum or phenolic resin; oleoresinous varnishes formed by heating one or more drying oils or bodied drying oils or bodied drying oils with one of the aforementioned resins; and alkyd resins, which are resinous products resulting from the reaction of a polyhydric alcohol with a dicarboxylic acid and fatty acids. Generally the polymer dispersion to be thickened contains from 10% to 70% by weight of one or more of the aforementioned polymers.

Only a small concentration of the thickener is required in the surface-coating compositions of this invention. As little as 0.01 percent of the hydroxyalkyl ether of the galactomannan gum, based on the weight of the composition, will bring about some thickening of the aqueous dispersions. Concentrations of 2 percent or more, based on the weight of the composition, can be used without adversely affecting the flow and leveling properties of the compositions or the water-resistance and other physical properties of films prepared from them. While the amount of thickener that is used in the surface-coating compositions is dependent to a large extent upon such factors as the rheology of the aqueous dispersion and the viscosity desired in the product, in most cases 0.1 percent to 1 percent of the thickener, based on the weight of the aqueous surface-coating composition, is used.

In addition to the water-insoluble resinous binder and the thickener, the aqueous surface-coating compositions may contain various auxiliary materials, such as emulsifying agents of the anionic, cationic, or non-ionic type; dispersing agents, plasticizers; pigments; extenders; dyes; defoaming agents; bactericides and/or fungicides; perfume-like materials including neutralizing and masking agents; other resinous materials, such as alkyd resins, drying oils, and natural resins; and corrosion inhibitors. These materials may be present in the amounts ordinarily used for these purposes. Paints that comprise water-insoluble resinous binders, about 30 percent to 60 percent of pigments and fillers, and the thickeners of this invention have a particularly advantageous combination of properties.

The surface-coating compositions of this invention are alkaline and ordinarily have pH values in the range of 7.0 to 9.5. Their alkalinity can be increased if desired by adding to the compositions the appropriate amount of an alkaline solution, such as an aqueous ammonium hydroxide solution or an aqueous sodium hydroxide solution.

The hydroxyalkyl ether of the galactomannan gum that is used as the thickener may be incorporated into the surface-coating composition by any convenient procedure. For example, it can be combined with pigments, extenders, dispersing agents, and other additives to form a pigment phase that is then mixed with water and the aqueous dispersion of the resinous binder to form a thickened surface-coating composition. Alternatively, it can be added to an aqueous dispersion that contains the resinous binder, pigment, and additives. The hydroxyalkyl ether of the gum can be added as such to the other components of the surface-coating composition, or it can be added as a dilute aqueous solution.

This invention is further illustrated by the following examples. In these examples, all parts are parts by weight and all percentages are percentages by weight.

EXAMPLE 1

Polyvinyl acetate emulsion paints were prepared by mixing together the following materials:

| | Paint (parts) | | |
|---|---|---|---|
| | 1A | 1B | 1C |
| Water | 766 | 766 | 766 |
| Polyethoxylated nonylphenol (Igepal CO-630 (N-99)) | 8 | 8 | 8 |
| Ethylene glycol | 80 | 80 | 80 |
| Hexylene glycol | 8 | 8 | 8 |
| Defoamer (Nopco NDW) | 8 | 8 | 8 |
| Bis(phenylmercury)dodecenylsuccinate (Super Ad-it) | 2 | 2 | 2 |
| 25% aqueous solution of sodium polyacrylate | 8 | 8 | 8 |
| Soya lecithin (water dispersible) | 12 | 12 | 12 |
| Thickener: | | | |
|   Hydroxyethyl ether of guar (D.S.-1.28) | 9 | | |
|   Hydroxyethyl ether of guar (D.S.-1.40) | | 9 | |
|   Methylcellulose (Methocel 90-HG) | | | 9 |
| Titanium dioxide | 400 | 400 | 400 |
| Talc | 200 | 200 | 200 |
| Calcined clay | 150 | 150 | 150 |
| Calcium carbonate | 300 | 300 | 300 |
| Diatomaceous silica | 8 | 8 | 8 |
| Aqueous emulsion containing 55% of polyvinyl acetate copolymer | 486 | 486 | 486 |
| Defoamer (Nopco NDW) | 2 | 2 | 2 |
| The paints had the following properties: | | | |
| pH | 7.3 | 7.3 | 7.2 |
| Viscosity (Krebs units): | | | |
|   Initial | 82 | 82 | 86 |
|   After 2 weeks at 120° F | 92 | 95 | 102 |
| Flow and leveling: | | | |
|   Initial | (1) | (1) | (2) |
|   After 2 weeks at 120° F | (1) | (1) | (2) |
| Freeze-thaw stability (5 cycles) | (3) | (3) | (3) |
| Contrast ratio (1.000=complete opacity over a black substrate): | | | |
|   Initial | 0.98 | 0.98 | 0.98 |
|   After 2 weeks at 120° F | 0.99 | 0.99 | 0.99 |

[1] Good.
[2] Poor.
[3] Pass.

EXAMPLE 2

A series of acrylic emulsion paints was prepared by mixing together the following materials:

| | Paint (parts) | | | | | |
|---|---|---|---|---|---|---|
| | 2A | 2B | 2C | 2D | 2E | 2F |
| Water | 646 | 646 | 646 | 646 | 646 | 646 |
| 25% aqueous solution of sodium polyacrylate | 50 | 50 | 50 | 50 | 50 | 50 |
| Alkyl aryl ether (Triton CF-10) | 10 | 10 | 10 | 10 | 10 | 10 |
| Thickener as 2.5% aqueous solution: | | | | | | |
|   Hydroxyethyl ether of guar (D.S.-1.28) | 1,363.5 | | | | | |
|   Hydroxyethyl ether of guar (D.S.-1.61) | | 1,363.5 | | | | |
|   Hydroxyproply ether of guar (D.S.-0.83) | | | 1,363.5 | | | |
|   Hydroxyethyl cellulose (Cellosize QB 4400) | | | | 1,363.5 | | |
|   Hydroxyproplymethyl cellulose | | | | | 1,363.5 | |
|   Methylcellulose (Methocel 90-HG) | | | | | | 1,363.5 |
| Defoamer (Colloid 600) | 15 | 15 | 15 | 15 | 15 | 15 |
| Hexylene glycol | 150 | 150 | 150 | 150 | 150 | 150 |
| Ethylene glycol | 75 | 75 | 75 | 75 | 75 | 75 |
| Bis(phenylmercury)dodecenylsuccinate (Super Ad-it) | 5 | 5 | 5 | 5 | 5 | 5 |
| Titanium dioxide | 900 | 900 | 900 | 900 | 900 | 900 |
| Silica | 397.5 | 397.5 | 397.5 | 397.5 | 397.5 | 397.5 |
| Calcined clay | 650 | 650 | 650 | 650 | 650 | 650 |
| Aqueous dispersion containing 43% of acrylic copolymer (66% of ethyl acrylate, 32.5% of methyl methacrylate, and 1.5% of acrylic acid). | 1,273.5 | 1,273.5 | 1,273.5 | 1,273.5 | 1,273.5 | 1,273.5 |
| The paints had the following properties: | | | | | | |
| pH: | | | | | | |
|   Initial | 8.5 | 8.7 | 8.7 | 8.7 | 8.5 | 8.4 |
|   After adjustment with NH₄OH | 9.1 | 9.2 | 9.1 | 9.3 | 9.1 | 9.1 |
| Viscosity (Krebs units): | | | | | | |
|   Initial | 115 | 115 | 120 | 114 | 107 | 121 |
|   After 1 month at 120° F | 110 | 108 | 115 | 109 | 102 | 116 |
| Flow and leveling: | | | | | | |
|   Initial | (1) | (1) | (2) | (2) | (2) | (2) |
|   After 1 month at 120° F | (1) | (1) | (2) | (2) | (2) | (2) |
| Freeze-thaw stability (5 cycles) | (3) | (3) | (3) | (3) | (3) | (3) |
| Contrast ratio (1.00=complete opacity over a black substrate): | | | | | | |
|   Initial | 0.99 | 0.99 | 0.99 | 0.99 | 0.99 | 0.99 |
|   After 1 month at 120° F | 0.99 | 0.99 | 0.99 | 0.99 | 0.99 | 0.99 |

[1] Very good. [2] Good. [3] Pass.

From the data in Examples 1 and 2 it will be seen that the paints that contained the thickeners of this invention (Paints 1A, 1B, 2A, 2B, and 2C) had better flow and leveling characteristics and in some cases better viscosity stability than did those that contained the conventional thickeners for water based paints.

EXAMPLE 3

A paint that contained as its resinous binder a copolymer that contained 80 percent of vinyl acetate and 20 percent of ethyl acrylate was prepared by mixing together the following materials:

| | Parts |
|---|---|
| Water | 168.0 |
| 2% Aqueous solution of hydroxyethyl ether of guar (D.S.-1.21) | 275.0 |
| Potassium tripolyphosphate | 1.0 |
| Propylene glycol | 30.0 |
| Polyethoxylated nonylphenol | 3.0 |
| Phenyl mercuric acetate (18% Hg) | 0.3 |
| Titanium dioxide | 200.0 |
| Calcium carbonate | 100.0 |
| Talc | 142.0 |
| Defoamer (Nuodex AF-100) | 2.0 |
| Vinyl acetate/ethylacrylate (80/20) copolymer latex (55% solids) | 228.0 |
| Butyl Cellosolve acetate | 8.0 |

This paint had better flow and leveling characteristics than did a comparable latex paint that contained hydroxypropylmethyl cellulose as its thickener.

The coating compositions of this invention can be applied to any suitable substrate, whether or not it has been painted previously and whether it is porous or non-porous. Such substrates include wood, plaster, stone, cement blocks, asbestos cement products such as shingles, gypsum board, ceramics, textiles, and the like.

The terms and expressions which have been employed are used as terms of description and not of limitation. There is no intention in the use of such terms and expressions of excluding any equivalents of the features shown and described or portions thereof, but it is recognized that various modifications are possible within the scope of the invention claimed.

What is claimed is:

1. A surface-coating composition that comprises (a) 10 percent to 70 percent by weight of a water-insoluble resinous binder selected from the group consisting of oleoresinous binders, synthetic addition polymers obtained by the vinyl polymerization of monoethylenically-unsaturated molecules, and mixtures thereof and (b) 0.01 percent to 2.0 percent, based on the weight of said composition, of a thickener that is a hydroxyalkyl ether of a galactomannan gum wherein said hydroxyalkyl group has from 2 to 6 carbon atoms and said gum has a degree of substitution in the range of 0.1 to 3.0.

2. A surface-coating composition as defined in claim 1 that contains 0.1 percent to 1 percent, based on the weight of the composition, of said thickener.

3. A surface-coating composition as defined in claim 1 wherein the hydroxyalkyl ether of a galactomannan gum is a hydroxyethyl ether of guar.

4. A surface-coating composition as defined in claim 3 wherein the hydroxyethyl ether of guar has a degree of substitution in the range of 0.5 to 2.0.

5. A surface-coating composition as defined in claim 1 wherein the resinous binder is a polyvinyl acetate copolymer.

6. A surface-coating composition as defined in claim 1 wherein the resinous binder is an acrylate copolymer.

7. A surface-coating composition as defined in claim 1 wherein the resinous binder is a copolymer that contains about 80 percent of vinyl acetate and 20 percent of ethyl acrylate.

8. A surface-coating composition as defined in claim 1 that additionally contains about 30 percent to 60 percent, based on the weight of said composition, of pigments and fillers.

References Cited
UNITED STATES PATENTS

| | | | |
|---|---|---|---|
| 3,080,332 | 3/1963 | Sullivan et al. | 260—17.4 ST |
| 3,350,386 | 10/1967 | Engelskirchen et al. | 260—209 R |

WILLIAM H. SHORT, Primary Examiner

E. M. WOODBERRY, Assistant Examiner

U.S. Cl. X.R.

117—161 R, 165; 260—18 R, 19 R, VA, 22 R, CB, 209 R